3,682,895
SYNTHESIS OF 3-HYDROXY-5-BUFA-
20,22-DIENOLIDE
George R. Pettit, 6232 Bret Hills Drive, Paradise Valley,
Ariz. 85253; Dyral C. Fessler, R.D. 1, Warner Road,
Norwich, N.Y. 13815; and Kenneth D. Paull, 8306
Roanoke Ave., Apt. 4, Takoma Park, Md. 20012
No Drawing. Filed July 17, 1970, Ser. No. 56,005
Int. Cl. C07c 173/04
U.S. Cl. 260—239.57                               9 Claims

ABSTRACT OF THE DISCLOSURE

There is provided a novel method of synthesizing $5\alpha$-bufadienolides, which are useful intermediates in the total synthesis of bufalin, a cardiac active compound. Epiandrosterone acetate is converted into $3\beta$ - acetoxy-$5\alpha$-pregnane-21-al which undergoes chain extension to methyl $3\beta$-acetoxy-20-formyl-21-nor-$5\alpha$-cholanate which is ring closed to form the $3\beta$ - acetoxy-$5\alpha$-buf-20(21)-enolide which is dehydrogenated to the corresponding bufadienolide.

DESCRIPTION OF THE PRIOR ART

The synthesis of bufalin and related compounds has been the subject of much recent activity.

A total synthesis of bufalin has been reported by Sondheimer et al. (J. Amer. Chem. Soc. 91, 1228, (1969)) and by Pettit et al. (Chem. Comm. 93 (1970)). The synthesis of a related bufadienolide, Scillarenin has been reported by Radscheit et al. (Tet. Let. #35, 3029, 3033 (1969)).

In view of the value of bufalin it was felt desirable to investigate synthetic routes starting from readily available starting materials such as epiandrosterone. This compound may be converted to the known $3\beta$-acetoxy-$5\alpha$-pregnan-21-oic acid (Marker et al. J. Amer. Chem. Soc. 64 1276 (1942)).

During the course of the experiments leading to the discoveries of the present invention many methods of dehydrogeneration of $\delta$-enol lactones to the desired 2-pyrones were found unsuccessful. The successful reagent, sulfur had not been used heretofore in this field of steroid chemistry (see however, Nagasampayi et al. Tetrahedron 22, 1949 (1966), Crawford and Supanekar J. Chem. Soc. 2380 (1964), Thiel et al., Ann 611, 121, (1958), Asinger et al., Ann 643 186 (1961), Wynberg, J. Amer. Chem. Soc. 80, 364 (1958) and Hitchings et al. J. Chem. Soc. 1019 (1956)).

The subject matter of the present invention is disclosed in Pettit et al., Can. J. Chem. 47, 2511 (1969) and J. Org. Chem. 35, 1398, (1970).

SUMMARY OF THE INVENTION

The process of the present invention uses epiandrosterone (Ia), a readily available natural product as starting material. This is then converted to a known $3\beta$-acyloxy-$5\alpha$-pregnane-21-al (Vb) by the steps set out in Chart I infra. The aldehyde (Vb) is converted into a corresponding enamine (VI) and condensed with alkyl acrylate to yield the corresponding alkyl $3\beta$-acyloxy-20-formyl-21-nor-$5\alpha$-cholanate (VIIa) which is subjected to ring closure condensation under acid conditions to yield the corresponding $3\beta$-acyloxy-$5\alpha$-buf-20(21)-enolide (VIII), which is then dehydrogenated to the corresponding bufadienolide (IX). It will be noted that the compounds prepared herein are $5\alpha$-steroids whereas bufalin is a $5\beta$-steroid. Thus there would be obvious advantages in carrying out this series of reactions starting with dehydroepiandrosterone $3\beta$-esters. An unsaturated linkage would thus already be in place in the $\Delta^5$ position, greatly facilitating the formation of a steroid of the $5\beta$-series. Indeed the corresponding $3\beta$-alkanoyloxy bufa-5, 20(21)-dienolide i.e. $\Delta^5$ compound (VIII) was prepared. However, the dehydrogenation of this compound series proved difficult. It was our surprising discovery that this dehydrogenation could be carried out, although great difficulty was experienced in finding a suitable dehydrogenating agent, on the $5\alpha$-bufenolide (VIII).

The $5\alpha$-butadienolide (IX) may be converted into resibufogenin (XXII) or into bufalin (XXIV) as shown in Charts II and III.

The $5\alpha$-bufadienolide (IX) may be converted into resmeans well known in the art. The $3\beta$-hydroxy-$5\alpha$-steroid (X) is oxidised to the corresponding 3-keto compound (XI) with Jones reagent and metabolised by *Pseudomonas testoteroni* ATCC 11966 to give the 3-keto-$\Delta^{1,4}$ compound (XII). Reduction by metabolization by *Clostridium paraputrificum* yields the $3\alpha$-hydroxy-$5\beta$-steroid (XIII) which is converted to the corresponding $3\beta$-hydroxy steroid (XVII). This may be done either by reoxidation with Jones reagent to yield the 3-keto-$5\beta$ steroid which is then reduced with an alkylphosphite in the presence of chloriridic acid, or directly by the method of Sondheimer et al. (J. Amer. Chem. Soc. 91, 1228 (1969)). In this procedure, the $3\alpha$-hydroxy compound (XIII) is tosylated and heated with dimethylformamide to yield sequentially, the $3\alpha$-tosylate (XIV) and the $3\beta$-formate (XV). The $3\beta$-formate (XV) is hydrolyzed by alumina to yield the desired $3\beta$-hydroxy steroid (XVII). In view of the necessity of protecting the 3-position against dehydration in subsequent steps, this position may be protected suitably with the alkanoyloxy group such as the acetoxy group by alkanolylation in the usual manner.

A 14-$\beta$ hydroxy group is then inserted into the molecule. This is obtained by hydration of a $\Delta^{14}$ bond. The $\Delta^{14}$ bond may be obtained by several routes, and those well known in the art are the microbial hydroxylation at C-15, for example *Fusarium orthoceras* (Camerino et al., Gazz. Chim. Ital 86, 126 (1956)). *F. oxysporum*, *F. lini*, *F. vasinfectum*, *F. moniliforme*, *F. concolor*, *G. Zeae and G. Cyanea* (Murray and Meister U.S. Pat. 2,889,255). Alternatively hydroxylation may occur at 14$\alpha$. Among the microorganisms capable of carrying out such oxydation may be mentioned *Helmintheosporium buchloes* (de Flines et al. Rec. Trav. Chim. 82, 149, (1963)).

Upon hydroxylation the 14$\alpha$ or 15$\alpha$ hydroxy steroid (XX) is dehydrated to give the desired $\Delta^{14}$ compound (XXI). The dehydration is carried out under acid conditions in accordance with the method of Engle et al. (Can. J. Chem. 1968, 46, 733). It is preferred to utilize the 14$\alpha$-hydroxy compounds to the 15$\alpha$-hydroxy compound since the possibility of obtaining undesired by-products is reduced.

The $\Delta^{14}$ compound (XXI) is epoxidised to give the desired 14, 15-epoxide (XXII). The alkanoyloxy group at 3 is then removed by hydrolysis on alumina to yield resibufogenin (XXIII).

Reduction of resibufogenin (XXIII) by lithiumaluminum hydride under very cold, anhydrous conditions yields bufalin (XXIV).

DESCRIPTION OF THE PREFERRED EMBODIMENTS

A 3β-acyloxy, preferably the 3 β-acetoxy-5α-pregnan-21-al (Vb) prepared in accordance with the procedures described hereinbelow is converted into the corresponding alkyl or aralkyl 3β-acetoxy-20-formyl-21-nor-5α-cholanate (VIIa). In the preferred procedure the aldehyde (Vb) is converted into the corresponding enamine. Suitably the aldehyde is taken up in a dry reaction inert, hydrocarbon solvent such as toluene, xylene, or the like or in acetonitrile and treated with a secondary amine, preferably a heterocyclic amine such as morpholine, pyrrolidine, or, most suitably piperidine in the presence of anhydrous mild base, alkali metal carbonates such as potassium carbonate being especially suitable. Alternatively molecular sieves may be used. There is utilized an excess of amine, suitably a 100 to 200% excess, but the degree of excess is not critical. The reactants are stirred, suitably at ambient temperature for from 1 to 6 hours, three hours usually being sufficient. The reaction mixture is then worked up. In the preferred method the reaction mixture is filtered and the filtrate evaporated to dryness, redissolved in fresh dry solvent and reevaporated to remove the last traces of amine. The enamine (VI) is then taken up in a reaction inert solvent such as dimethylformamide, dimethyl sulfoxide, tetrahydrofuran or formal acetonitrile being especially suitable. A small excess, say a 50% excess of alkyl or aralkyl acrylate is then added and the mixture heated under reflux. Among the suitable acrylates are methyl-, ethyl-, propyl-, butyl-, and benzyl-acrylates. The heating under reflux proceeds for from about 40 to about 80 hours. The only critical feature in both the first and the second stages of the reaction is the anhydrous nature of the environment. The reactions should be carried out in a dry atmosphere, preferably a nitrogen atmosphere in dry solvents. The solvents are previously dried by distillation into the reaction vessel from phosphorus pentoxide.

The condensation reaction is quenched by the addition of aqueous acid, suitably a moderately strong organic acid such as aqueous acetic acid or the like. The quenching is completed by heating the mixture under reflux for about one hour. The reaction mixture is cooled and worked up in the usual manner to yield the corresponding alkyl or aralkyl 3β-acetoxy-20-formyl 21-nor-5α-cholanic ester (VIIa). The aldehyde ester (VIIa) is then subjected to ring closure to form the 3β-acetoxy-5α-buf-20(21) enolide (VIII). In the preferred procedure the ester is saponified to the corresponding acid (VIIb). Suitably the ester (VIIa) is taken up in a suitable water miscible solvent, tetrahydrofuran/methanol being suitable and aqueous base added thereto. Alkali metal carbonates such as 5% aqueous sodium carbonate or the like may be used. The mixture is held at ambient temperatures for from about 1 to about 5 hours and worked up in the usual manner to yield the acid (VIIb).

The acid (VIIb) is then subjected to ring closure to yield the desired buf-20(21)-enolide (VIII). Strong organic acids and certain Lewis acids have been found to be satisfactory lactonizing agents. Among the organic acids may be mentioned p-toluene sulfonic acid, methane sulfonic acid and the like. The suitable Lewis acids include Bronsted acid, polyphosphoric acid, boron trifluoride and thallium tri(trifluoroacetate). The use of the common lactonizing agent acetic anhydride/sodium acetate is not favored. The reactants are taken up in a suitable hydrocarbon solvent such as benzene, toluene and the like. There is utilized between 5 and 15% by weight, suitably about 10% by weight of lactonizing agent based on aldehydic acid (VIIb). The reaction may proceed at temperatures of between about 20° and about 120° C. Since water is generated during the reaction and the presence of water is unfavorable to the desired reaction equilibrium, it is preferred to carry out the reaction at reflux temperatures, removing the water/solvent azeotrope by continuous distillation, suitably by means of a Dean-Stark trap. It has been found particularly effective to charge 4-A type molecular sieve into the Dean-Stark trap. The reaction time will vary with the catalyst used; however, reaction times of between about 10 and about 30 hours have been found adequate to remove all of the water produced. The buf-20(21)-enolide (VIII) is then isolated, suitably by evaporation of the solvent and chromatography on a silica gel column.

The buf-20(21)-enolide(VIII) is then dehydrogenated to the 3β-acetoxy-5α-bufa-20, 22-dienolide (IX). The usual dehydrogenation agents were found capricious. However especially fine results have been obtained using sulfur as the dehydrogenating agent.

In the preferred modification of the method the buf-20(21)-enolide (VIII) is taken up in a solution of sulfur in carbon disulfide. The carbon disulfide is evaporated to give a finely divided and intimate mixture of the reactants. There is utilized a large excess of sulfur, between 2 and 4 parts by weight of sulfur relative to the buf-20(21)-enolide have been found suitable. The mixture is then heated, suitably under a gentle flow of inert gas, nitrogen being preferred. Preferably, heating is carried out in a metal bath, to bath temperature of between 180 and 250° C., suitably between about 200 and 225° C. for from about 15 to 30 minutes. The optimum conditions may be determined by sampling and analysis of the samples by thin layer chromatography. The product is extracted with a suitable solvent and purified, chromatography being a suitable mode of purification.

The thus prdouced dienolide may then be converted to resibufogenin or bufalin. In the first step of the conversion the 5α-hydrogen must be converted to a 5β-hydrogen.

In one modification of this procedure the 3β-acyloxy group is removed by saponification in the usual manner and the resulting 3β-hydroxybufadienolide (X) is oxidized to the corresponding 3-oxo analog (XI).

In the preferred mode, (X) is taken up in aqueous acetone (acetone: water in 100:4) and an excess, say a 0.5–1 molar excess of Jones reagent (Bowers et al., J. Chem. Soc. 548 (1953)) is added thereto. The reaction is allowed to proceed at ambient temperature for from about 8 to about 18 hours after which time the reaction is quenched with 2-propanol. The reaction mixture is evaporated and the residue extracted with ether.

The 3-oxo-5α-steroid (XI) is then converted to the corresponding 3-oxo-$\Delta^{1,4}$ steroid (XII) by metabolization with *Pseudomonas testosteroni* ATCC 11996 in accordance with the method of Levy and Talaly (J. Amer. Chem. Soc. 79, 2658 (1957)). The conversion may also be carried out using *Mycobacterium smegmatis* as set forth in British Patent 850,951. The compound (XII) is then reduced by metabolization with *Clostridium paraputrificum* according to the method of Schubert et al. (Z. Physiol Chem. 332, 310 (1963)) to yield the corresponding 3α-hydroxy-5β-steroid (XIII).

In the preferred modification the 3α-hydroxy-5β-steroid (XIII) is oxidized to the corresponding 3-oxo-5β-steroid (XVI) with Jones reagent in the manner discussed hereinabove. (XVI) is then reduced to the desired 3β-hydroxy-5β-steroid (XVI).

In the preferred modification the 3-oxo compound (XVI) is taken up in a lower alkanol suitably 2-propanol and heated under reflux with chloriridic acid in the presence of a trialkyl phosphite, suitably trimethyl phosphite. There is utilized an excess say a 50 to 100% molar excess of the trialkyl phosphite and a catalytic amount, say 10 molar percent of the chloriridic acid. The mixture is heated under reflux for from about 40 to about 80 hours. The reaction mixture is then quenched with water and the aqueous suspension extracted with a water immiscible solvent to yield, on evaporation the corresponding 3β-hydroxy-5β-steroid (XVII).

In order to protect this 3β-hydroxy group from dehydration in the subsequent steps it is desirable to react it with a protecting group. Acylation, alkanoylation, preferably acetylation say with acetic anhydride in the usual manner is the method of choice to form the desired 3β-acyloxy derivative such as the 3β-acetoxy-5β-bufa-20,22-dienolide (XVII).

The compound (XVII) is subjected to hydroxylation at 14α or 15α suitably by the microbiological routes set forth hereinabove, to yield compounds (XXa and b), which are then dehydrated. In the preferred modification compound (XX) is taken up in an anhydrous medium such as benzene, toluene, or the like and treated with a strong acid, suitably a mineral acid, gaseous hydrochloric acid being preferred. The gas is preferably passed for about 2 hours and the solvent and surplus gas removed by evaporation to yield the desired 14-dehydro product (XXI).

The thus produced 3β-acetoxy Δ$^{14}$-dehydrobufalin (XXI) is then taken up in a suitable reaction inert solvent, suitably a chlorinated hydrocarbon solvent such as chloroform or methylene chloride and treated with an excess of peracid. It is generally preferred to use an organic peracid, chloroperbenzoic acid being particularly suitable. The reaction is run for from about 3 to about 6 hours at between ambient temperature. The reaction is then quenched by the addition of aqueous base, suitably sodium hydroxide to destroy the excess peracid. The reaction mixture is then extracted to yield, on work up, the cardiac active agent, resibufogenin acetate (XXII).

Resibufogenin 3β-acylate, suitably the 3β-acetate (XXII) is subjected to very mild hydrolysis to remove the acyloxy group. Where the acyloxy group is the acetoxy group it is removed by mixing an ethereal solution of (XXII) with active basic alumina and pouring the slurry into a column. The mixture is allowed to stand for about 18 to about 36 hours at ambient temperature. Elution with ether/chloroform yields resibufogenin (XXIII) which may be readily recrystallized from chloroform/methanol.

Where it is desired to produce bufalin, compound (XXIII) is taken up in a dry ethereal solvent, suitably tetrahydrofuran or diethylether, and treated with a slight excess, say a 10–20% molar excess of lithiumaluminum hydride at low temperatures, suitably at −70 to −40° C. The reaction may be quenched either with wet ether and aqueous hydrochloric acid. The aqueous mixture is then extracted with a water immiscible solvent, which, upon evaporation after the usual workup gives bufalin (XXIV).

Alternatively the 3β-hydroxy-5β-steroid (XVII) may be obtained by another route. In this procedure the 3α-hydroxy-5β-steroid (XIII) is reacted with a sulfonyl chloride, suitably p-toluene sulphonyl chloride in the usual manner to yield say, the tosylate (XIV) which is treated with hot-dimethyl formamide. In this procedure the tosylate is taken up in dimethyl formamide and heated for from about 60 to about 90 hours at from about 70% to about 90%. The solvent is removed under reduced pressure, to yield the corresponding 3β-formyloxy-5β-steroid (XV) which is then saponified by taking it up in a slightly polar, non-hydroxylic solvent, suitably diethylether, and shaking with basic alumina for about 20 to about 80 hours at ambient temperature.

It is preferred to pour the mixture into a column after this stage, and eluting the 3β-hydroxy-5β-steroid with chloroform/methanol.

The starting material in this process, i.e., 3β-hydroxy-5α-pregnan-21-21 (Vb) is prepared as follows:

3β-hydroxy-17-oxo-5α-androstane is converted to the corresponding 17-cyanomethylene compound (II) by the method of Bose and Dahill (J. Orr. Chem. 30,505 (1965)). In this procedure there is added, suitably dropwise, a solution of a dialkyl cyano methyl phosphonate, suitably the dimethyl ester in a suitable solvent, preferably an ethereal solvent such as tetrahydrofuran, to a suspension of a strong base in a similar solvent. It has been found useful to utilize an alkali metal hydride such as sodium hydride or the like for this purpose. There are utilized 1 to 2 moles, suitably 1 to 1.5 moles of phosphonate per mole of hydride. The reaction is carried out at reduced temperatures, ice bath temperatures being especially convenient.

To the resultant solution is added the 3β-hydroxy-17-oxo-5α-androstane 3β-alkanoate in a similar solvent. There are utilized between 0.3 and 0.6 suitably 0.35 and 0.45 mole of steroid per mole of phosphonate originally charged. The mixture is allowed to stand at ambient temperature for from about 12 to about 24 hours and worked up. In the preferred procedure the mixture is concentrated under reduced pressure to about ⅕ of the original volume and quenched by pouring into a substantial excess of water, followed by extraction with a water immiscible solvent, suitably ethyl acetate or the like, to yield, upon evaporation, a pasty residue. This residue is contaminated by mineral oil which is removed by chromatography and recrystallization to yield say 3β-hydroxy-20-cyano-21-norpregn-17(20)-ene 3β-acetate (II).

The pregnene (II) is reduced to the corresponding pregnane. This reduction is suitably carried out by catalytic hydrogenation. The catalyst of choice is 5% palladium on calcium carbonate. The hydrogenation is suitably carried out at ambient temperature and atmospheric pressure using about 15% by weight of catalyst per part by weight of pregnene charged. The solvent utilized is preferably an ethereal solvent such as tetrahydrofuran or the like. Hydrogenation is usually complete in between 18 to 30 hours. The hydrogenation mixture is then worked up in the usual manner and recrystallized to yield say 3β-hydroxy-20-cyano-21-nor-pregnane 3β-acetate (III).

The 20-cyano compound (III) is hydrolysed by base hydrolysis to the corresponding acid. In this procedure the 20-cyano compound (III) is taken up in a high boiling hydroxylic solvent, suitably ethylene glycol and heated with an excess of alkali such as sodium or potassium hydroxide. It is preferred to use from about 2 to about 4 moles of alkali per mole of steroid. Suitably the reaction mixture is heated under reflux until the evolution of ammonia has ceased. The reaction mixture is then worked up. In the preferred procedure the warm reaction mixture is poured onto ice, acidified, suitably with mineral acid and separated by filtration to yield, as the residue crude 3β-hydroxy pregnan-21-oic acid (IVa) which is then reacylated, suitably reacetylated, preferably with acetic anhydride/pyridine in the usual manner, to yield the corresponding 3β-acetate (IVb) on purification. The material produced by this method was substantially identical with that reported in the literature (Marker et al. J. Amer. Chem. Soc. 64, 1276 (1942)).

The acid (IVb) is then reduced to the corresponding aldehyde. In the preferred modification the acid is treated with a suitably acid halide, thionyl chloride or oxalyl chloride being preferred, in a suitable solvent, preferably a hydrocarbon solvent such as benzene or the like. Suitably there is added a solution of 2–4 moles of oxalyl chloride per mole of acid in benzene to an ice cold solution of acid (IVb) in the same solvent. The resultant mixture is allowed to stand, suitably at ambient temperature for from about 1 to 3 hours, suitably for about 15 hours. The solvent is then evaporated, residual oxalyl chloride being removed by resolution in benzene followed by re-evaporation.

The acid chloride (Va) is then reduced by catalytic hydrogenation. 10% palladium on barium sulfate has been found to be a suitable catalyst. The acid chloride is dissolved in a reaction inert, high boiling hydrocarbon solvent, suitably toluene or xylene, the catalyst added thereto and the reaction mixture hydrogenated.

It has been found that yields are improved by maintaining the bath temperature at between about 90 to about 95° C. and the hydrogen pressure in the reaction vessel at slightly under atmospheric pressure. The reaction is complete in from about 1 to about three hours. Work up and recrystallization yields 3β-acetoxy-5α-pregnen-21-al (Vb).
In the following examples all temperatures are in °C.
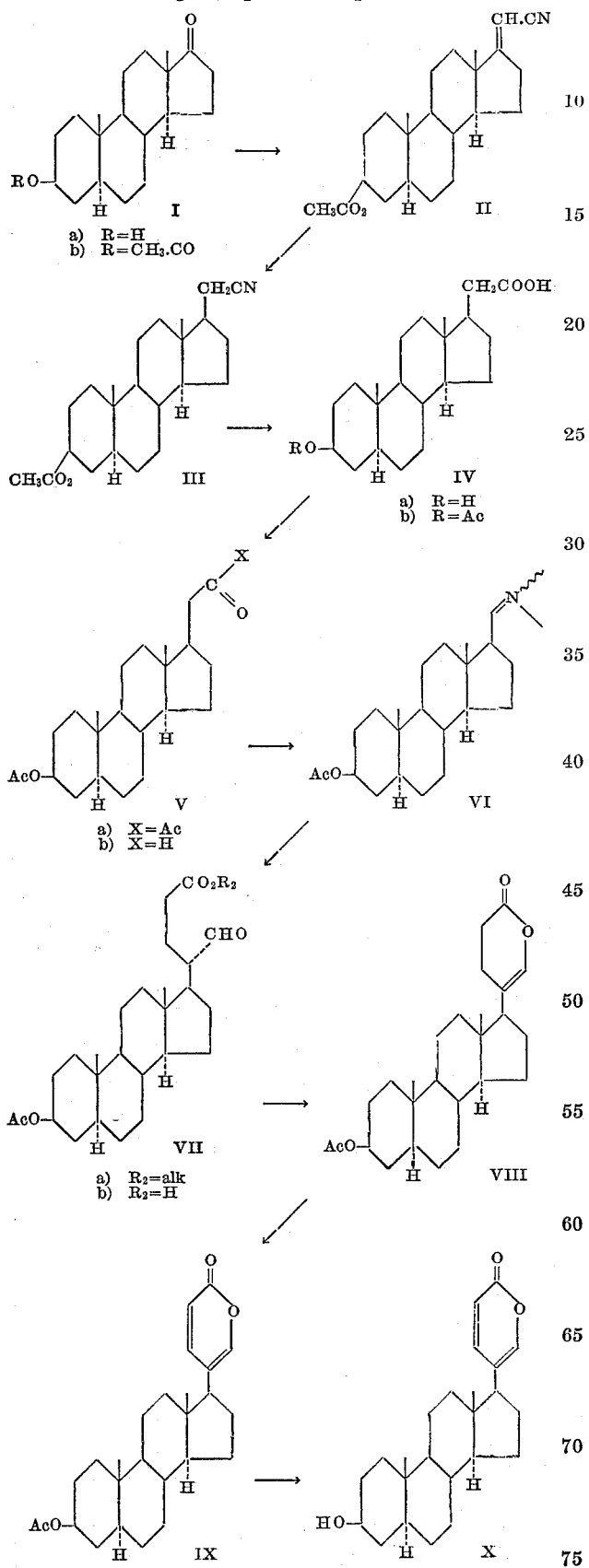
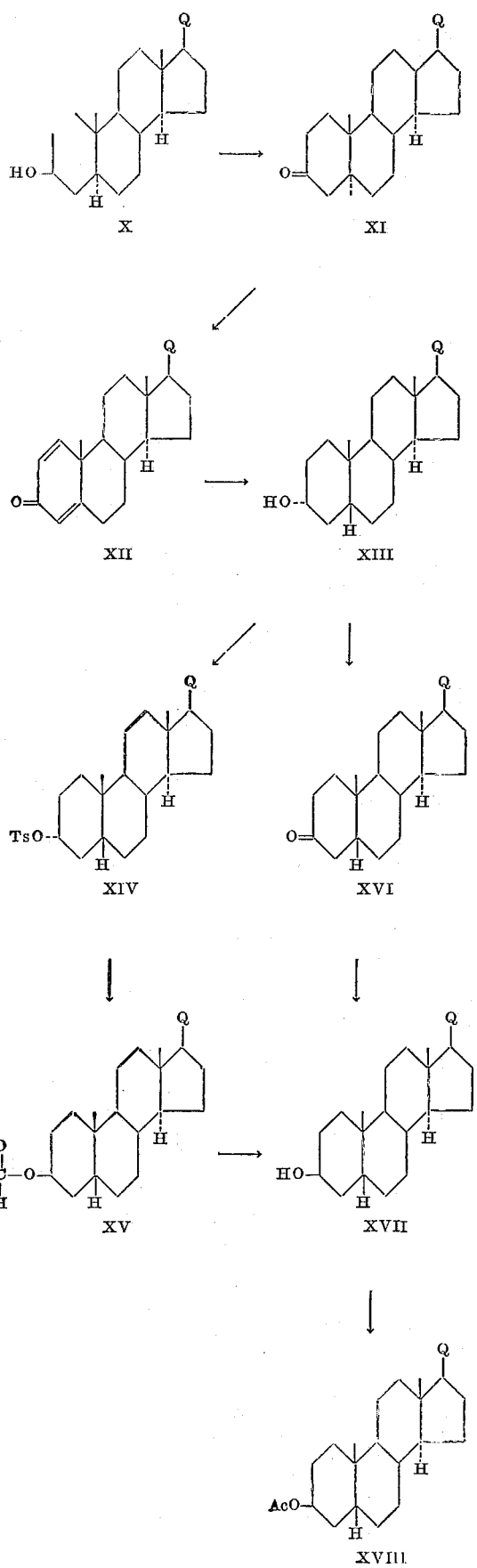
CHART II

CHART III

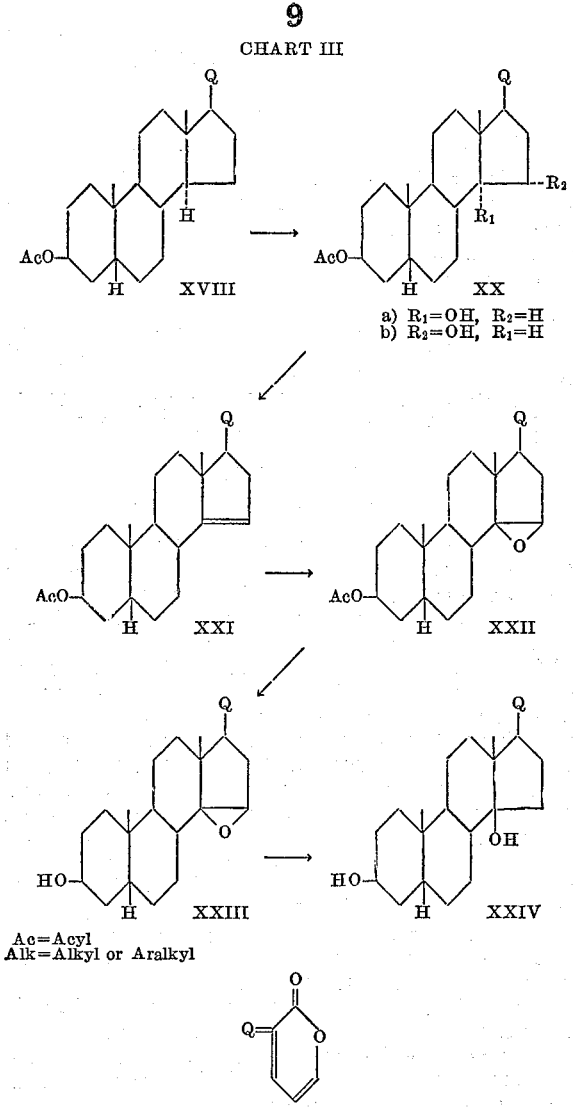

a) R₁=OH, R₂=H
b) R₂=OH, R₁=H

Ac=Acyl
Alk=Alkyl or Aralkyl

EXAMPLE I

Methyl 3β-acetoxy-20-formyl-21-nor-5α-cholanate (VIIa)

A mixture of 3β-acetoxy-5α-pregnan-21-al (Vb) (2.7 g.), anhydrous potassium carbonate (5.4 g.), piperidine (2.7 g.), and dry toluene (140 ml.) was stirred at room temperature 3 hours. The solution was filtered and evaporated (reduced pressure) to dryness. Traces of piperidine were removed by addition and evaporation of dry toluene (2× 100 ml.) To the enamine (VI) in acetonitrile (150 ml.) was added methyl acrylate (1.3 g.) and the solution heated to reflux for 60 hours. Acetic acid (0.5 ml.) and water (10 ml.) were added and heating at reflux continued 1 hour. The reaction mixture was cooled, washed with saturated sodium chloride solution, and concentrated (reduced pressure) to an oil (2.5 g.). The resulting oil (2.5 g.) was dissolved in 19:1 hexane-ethyl acetate and adsorbed on a column of silica gel (150 g.) Continued elution with the same solvent resulted in some (0.45 g.) recovery of aldehyde (Vb). Elution with 9:1 hexane-ethyl acetate afforded methyl 3β-acetoxy-20-formyl-21-nor-5α-cholanate (VIIa) (1.5 g.). An analytical sample was obtained by preparative chromatography on ChromAR 1000 (17:3 hexane-ethyl acetate development, band eluted with ether) followed by crystallization from ethyl acetate-hexane: M.P. 123–126°; $\nu_{max.}$ 2690, 1740 (broad), 1390, and 1260 cm.⁻¹; pmr. δ 0.62 (singlets, 3 protons, 18-methyl of $C_{20}$-epimers), 0.7, 0.8 (3 protons, 19-methyl), 2.05 (3 protons, acetate), 3.65 (3 protons, methyl ester), and 9.5 (d, J=4 cps., aldehyde).

Analysis.—Calcd. for $C_{27}H_{42}O_5$ (percent): C, 72.61; H, 9.48. Found (percent) C, 72.91; H, 9.26.

In somewhat larger scale experiments, Molecular Sieve type 4A, 3.5 g./3 g. of aldehyde (Vb) was employed in place of anhydrous potassium carbonate with comparable results. The crude product in 2:1 pentane/benzene was chromatographed on a column of silica gel (250 g./3 g. aldehyde). Fractions eluted by 9:1 pentane-ethyl acetate contained aldehyde (Vb) and those eluted with 17:3 pentane-ethyl acetate contained methyl ester (VIIa). Yields of methyl ester ranged from 45 to 49%.

In accordance with the foregoing procedure, but starting, in place of 3β-acetoxy-5α-pregnan-21-al, with 3β-propoxy, 3β-butyroxy, 3β-valeroxy- or 3β-benzoxy-5α-pregnan-21-al, there is obtained the corresponding methyl 3β-acyloxy-20-formyl-21-nor-5α-cholanate.

In accordance with the foregoing procedure but where in place of methyl acrylate there is used ethyl acrylate, propyl acrylate, butyl acrylate, benzyl acrylate or phenyl acetyl acrylate there is obtained the corresponding alkyl or aralkyl 3β-acyloxy-20-formyl-21-nor-5α-cholanate.

EXAMPLE II

3β-acetoxy-5α-buf-20(21)-enolide (VIII)

To a solution of methyl 3β-acetoxy-20-formyl-21-nor-5α-cholanate (VIIa) (0.55 g.) in tetrahydrofuran (15 ml.), methanol (6 ml.) was added 10 ml. of 5% aqueous sodium carbonate. The mixture was stirred at room temperature 3 hr., then neutralized with 6 N hydrochloric acid and concentrated to approximately 10 ml. using a rotating evaporator. The aqueous phase was acidified with 6 N hydrochloric acid and extracted with ethyl acetate. The combined ethyl acetate extract was extracted with 10% aqueous potassium carbonate. Next, the combined aqueous solution was acidified (6 N hydrochloric acid) and extracted with ethyl acetate. The ethyl acetate extract was washed with water and evaporated to yield (72%) 0.38 g. of colorless crystalline carboxylic acid (VIIb) exhibiting one spot on a thin layer chromatogram (4:1:0.2 pentane-ethyl acetate-acetic acid mobile phase). A 0.53 g. specimen prepared in the same manner was dissolved in dry benzene (50 ml.) containing p-toluenesulfonic acid (0.06 g.). The solution was heated at reflux 25 hr. employing a Dean-Stark trap containing molecular sieve type 4–A. The solution was cooled and added to a column of silica gel (7 g.). Elution with 400 ml. of benzene gave 0.37 g. (73%) of colorless crystals of 3β-acetoxy-5α-buf-20(21)-enolide (VIII) melting at 181–184°. The product (VIII) appeared as a single spot on a thin layer chromatogram (4:1 pentane-ethyl acetate mobile phase). Recrystallization from ethyl acetate-hexane afforded an analytical sample as needles: $\nu_{max.}$ 2940, 1760 (enol lactone carbonyl), 1740 (acetate carbonyl), 1670 (olefin), 1260, and 1140 (doublet) cm.⁻¹; RD (25°) c, 0.515, $[\alpha]_{420}$ 0° (slightly negative 420–650), $[\alpha]_{320}$ +58.3°, and $[\alpha]_{290}$ +166.9°; pmr. δ 0.60 (3 protons, 18-methyl), 0.83 (3 protons, 19-methyl), 2.05 (3 protons, acetate), and 6.36 (broad, 1 proton, $C_{21}$–H).

Analysis.—Calcd. for $C_{26}H_{28}O_4$ (percent): C, 75.32; H, 9.24. Found (percent): C, 75.27; H, 8.99.

In accordance with the above procedure, but starting with any of the alkyl or aralkyl-3β-acyloxy-20-formyl-21-nor-5α-cholanates produced in accordance with Example I other than the methyl 3β-acetoxy-20-formyl-21-nor-5α-cholanate utilized above, there is obtained the corresponding 3β-acetoxy-5α-bufa-20(21)-enolide.

EXAMPLE III

3β-acetoxy-5α-bufa-20,22-dienolide (IX)

An intimate mixture of 3β-acetoxy-5α-buf-20(21)-enolide (VIII) (0.10 g.) and sulphur (0.20 g.) was heated at 221–227° (nitrogen atmosphere) for 0.5 hr. After 1 min. in the required temperature range evolution of hydrogen sulfide was detected using moist lead acetate paper and by odor. After cooling, the mixture was dissolved in carbon disulfide. A thin layer chromatogram (4:1 pentane-ethyl acetate mobile phase) indicated a major component accompanied by a lesser quantity of starting material (VIII) and a more polar side product. The carbon disulfide solution was chromatographed on a column of silica gel (20 g.). The oily fraction eluted by 2:1 benzene-ether weighed 0.06 g. (60%), and was essentially pure by TLC. The analytical sample was further purified by preparative TLC on ChromAR 1000 (10:1 pentane-ethyl acetate mobile phase) and recrystallized twice from methanol to afford needles of 3$\beta$-acetoxy-5$\alpha$-bufa-20,22-dienolide (IX) melting at 194–195°; $\gamma_{max}$. 300 m$\mu$ (E, 6,400); $\nu_{max}$. 1740, 1640, 1540, 1250, 835, and 800 cm.$^{-1}$; pmr. $\delta$ 0.53 and 0.83 (18 an 19-methyls), 4.7 diffuse, 3$\alpha$-proton), 6.25 (C–23 proton, d, J=10.5 cps.) and 7.20–7.41 (complex, 2-pyrone ring protons).

*Analysis.*—Calcd. for $C_{26}H_{36}O_4$ (412) (percent): C, 75.69; H, 8.80. Found (percent): C, 75.75; H, 9.03 mol. wt. (mass spec.) 412.

(a) Decoupling experiments showed the doublet at 6.185 coupled to the 7.20–7.41 signals and further supported the structural assignment.

In accordance with the foregoing procedure but starting, in place of 3$\beta$-acetoxy-5$\alpha$-buf-20(21)-enolide, with any of the other 3$\beta$-acyloxy-5$\alpha$-buf-20(21)-enolides prepared in accordance with Example II, there is obtained the corresponding 3$\beta$-acyloxy-5$\alpha$-bufa-20,22-dienolide.

EXAMPLE IV

3$\beta$-hydroxy-5$\alpha$-buf-20,21-enolide (X)

An ether solution of 3$\beta$-acetoxy-5$\alpha$-buf-20,22-dienolide (IX) is mixed with activated alumina (Wolem, basic activity 3, pH approximately 8–9) and placed in a small column. After 24 hours the column is eluted with ether/chloroform to yield, on evaporation 3$\beta$-hydroxy-5$\alpha$-buf-20,(22)dienolide (X).

PREPARATION I

3$\alpha$-acetoxy-20-cyano-21-nor-5$\alpha$-pregn-17(20)-ene (II)

A solution of diethyl cyanomethylphosphonate (61.0 g.) in tetrahydrofuran (250 ml.) was added dropwise (under nitrogen) to a stirred suspension of sodium hydride (12.9 g. of 54% in oil) in tetrahydrofuran (350 ml.) at ice bath temperature. The clear yellow solution was stirred 0.5 hour. A solution of 3$\beta$-acetoxy-17-oxo-5$\alpha$-androstane (Ib) (48.0 g.) in tetrahydrofuran (150 ml.) was added and the resulting solution was allowed to stand at room temperature 19 hours. The mixture was concentrated (reduced pressure) to ca. 200 ml., poured into water (600 ml.), and extracted with ethyl acetate. The combined ethyl acetate extract (400 ml.) was washed successively with 5% aqueous sodium bicarbonate, water, and saturated aqueous sodium chloride. Following removal of solvent the residue was recrystallized from ethyl acetate-ligroin to yield 36 g. of needles melting over the range 127–188°. Two impurities in trace amounts were present as evidenced by a thin layer chromatogram. Further purification was accomplished as now summarized for the mother liquor material. The ethyl acetate-ligroin filtrate was concentrated and the viscous oil residue was chromatographed in pentane on a column of silica gel (200 g.). Elution with pentene eliminated the mineral oil and the fraction obtained with benzene was recrystallized from benzene-pentane to yield 9.6 g. of 3$\alpha$-acetoxy-20-cyano-21-nor-5$\alpha$-pregn-17(20)-ene (II) which exhibited one spot on a TLC plate (4:1 pentane-ethyl acetate mobile phase). The total yield of comparable product amounted to 89%. Two recrystallizations from ethyl acetate-pentane and another two from methanol afforded an analytical specimen as needles: M.P. 199–200°; and $\nu_{max}$ 2210 (C=N), 1730, 1640, and 1245 cm.$^{-1}$.

*Analysis.*—Calcd. for $C_{23}H_{33}NO_2$ (percent): C, 77.70; H, 9.36; N, 3.94. Found (percent): C, 77.52; H, 9.45; N, 4.05.

PREPARATION II

3$\beta$-acetoxy-20-cyano-21-nor-5$\alpha$-pregnane (III)

A mixture of 3$\beta$-acetoxy-20-cyano-21-nor-pregn-17(20)-ene (III) (20 g.) and 5% palladium on calcium carbonate (5 g.) in tetrahydrofuran (500 ml.) was hydrogenated for 48 hours. The solution was filtered through Celite and evaporated (reduced pressure) to yield (III) as white needles. Three crystallizations from methanol afforded a pure sample of 3$\beta$-acetoxy-20-cyano-21-nor-5$\alpha$-pregnane (III) as needles; M.P. 200–202° C; $\nu_{max}$ 240 (C=N), 1725, and 1250 cm.$^{-1}$.

*Analysis.*—Calcd. for $C_{23}H_{35}NO_2$ (percent): C, 77.27; H, 9.87; N, 3.92. Found (percent): C, 77.52; H, 9.52; N, 4.05.

PREPARATION III

3$\beta$-acetoxy-5$\alpha$-pregnan-21-oic acid (IV)

A solution of 3$\beta$-acetoxy-20-cyano-21-nor-5$\alpha$-pregnane (III) (19.5 g.) and 15 g. of potassium hydroxide were taken up in 400 ml. of ethyleneglycol and heated in a nitrogen atmosphere under reflux until evolution of ammonia ceased. The reaction mixture was poured on ice (1.51), acidified with 5 N sulfuric acid and filtered to yield the crude acid (IVa). The crude product was acetylated (1:3 acetic anhydride/pyridine) at room temperature. The acetylation mixture was diluted with water and extracted with ethyl acetate. Following removal of ethyl acetate the residue was dissolved in hot acetic acid and water was added to the opalescence point. Upon cooling the solid which separated was collected, washed with water and recrystallized from methanol to yield 3$\beta$-acetoxy-5$\alpha$-pregnan-21-oic acid (IVb) (17.1 g.), M.P. 190–195° C., (lit.[1]) reports M.P. 191–193° C. for 3$\beta$-acetoxy pregnan-21-oic acid (IVa). The acid displayed one spot on a thin layer chromatogram (4:1:0.5 pentane-ethyl acetate-acetic acid) and was used without further purification.

In accordance with the above procedure but where, in place of acetic anhydride, there is utilized propionyl chloride, butyryl chloride, valeryl chloride, benzoyl chloride or phenylacetyl chloride, there is obtained the corresponding 3$\beta$-acyloxy-5$\alpha$-pregnan-21-oic acid.

PREPARATION IV

3$\beta$-acetoxy-5$\alpha$-pregnane-21-al (Vb)

A solution of oxalyl chloride (5 ml.) in benzene (15 ml.) was added to an ice cold solution of carboxylic acid (IVb) (2.7 g.) in benzene (50 ml.). The pale yellow solution was allowed to stand 1.5 hours and solvent was evaporated (reduced pressure) to a yellow solid. Traces of oxalyl chloride were removed by addition and evaporation of dry benzene (3 × 50 ml.).

The acid chloride (Va) was dissolved in dry toluene (50 ml.) and heated (oil bath) to 110° with palladium on barium sulfate (0.5 g. of 5%). Hydrogen was then bubbled through the mixture for 2 hours. Upon cooling, the solution was filtered through basic alumina. Continued elution with benzene and removal of the solvents under reduced pressure yielded 3$\beta$-acetoxy pregnan-21-al (Vb) (1.9 g.; 72%). Crystallization from hexane afforded an analytical sample: M.P. 125–128°: $\nu_{max}$ 2940, 1740 (broad), 1255, and 1040 cm.$^{-1}$; RD, (25°) c., 0.450, [$\alpha$]$_{400}$ −16.0°, [$\alpha$]$_{305}$ −66.7°, and [$\alpha$]$_{260}$ +11.1°; pmr., $\delta$ 0.62 (e protons, 18-methyl), 0.86 (3 protons, 19-methyl), 2.18 (3 protons, acetate), and 9.8 (t, J=2 Hz., 1 proton aldehyde).

*Analysis.*—Calcd. for $C_{23}H_{36}O_3$ (percent): C, 76.62; H, 10.07. Found (percent): C, 76.81; H, 9.96.

The yield of above Rosenmund reduction was improved by carefully regulating (with a water aspirator) the hydro- ---
[1] R. E. Marker, H. Crooks, E. Jones, and A. Shabica, J. Am. Chem. Soc., 64, 1276 (1942).

gen flow while maintaining a slightly reduced internal pressure. The reaction mixture temperature was maintained (oil bath) at 90–93° for 2 hours. Yields of aldehyde (Vb) ranged from 86–96%.

In accordance with the foregoing procedure but where in place of 3β-acetoxy-5α-pregnan-21-oic acid, there are utilized any of the other 3β-acyloxy-5α-pregnan-21-oic acids produced in accordance with preparation (III), there are obtained the corresponding 3β - acyloxy-5α-pregnan-21-als.

What is claimed is:

1. 3β-hydroxy-5α-bufa-20,22-dienolide and the 3β- alkanoates thereof.
2. 3β-hydroxy-5α-bufa-20,22-dienolide, a compound of claim 1.
3. 3β-hydroxy-5α-bufa-20,22-dienolide 3β-acetate.
4. In the process of preparing bufalin from a 3β-hydroxy - 5α - pregnan-21-al 3β-acylate, the steps comprising:
    (a) sequentially reacting a 3β-hydroxy-5α-pregnan-21-al-3β acylate with
        (i) a secondary heterocyclic amine
        (ii) a lower alkyl or aryl lower alkyl acrylate,
    (b) reacting the thus produced 3β-acyloxy-20-formyl-21-nor-5α cholanic ester sequentially with
        (i) aqueous base
        (ii) a strong acid, and
    (c) dehydrogenating the thus produced 3β-acyloxy-5α-bufa-20(21) enolide.
5. A process of claim 4 wherein the 3β-acyloxy group is alkanoyloxy, or aralkanoyloxy.
6. A process of claim 5 wherein the 3β-acyloxy group is acetoxy.
7. A process of claim 4 wherein in the dehydrogenating agent is sulfur.
8. A process of claim 4 wherein the heterocyclic amine is piperidine, morpholine or pyrrolidine.
9. A process of claim 4 which comprises:
    (a) sequentially reacting 3β-hypdroxy-5α-pregnan-21-al-3β-acetate with
        (i) piperidine in toluene
        (ii) methyl acrylate in acetonitrile
    (b) reacting the thus produced methyl 3β-acetoxy-20-formyl-21-nor-5α-cholanate sequentially with
        (i) aqueous alkali metal carbonate
        (ii) p-toluene sulfonic acid and
        (iii) dehydrogenating the thus produced 3β-acetoxy-5α-bufa-20(21)-enolide with sulfur.

References Cited
UNITED STATES PATENTS
3,574,198   4/1971   Radscheit et al. ___ 260—239.57

HENRY A. FRENCH, Primary Examiner

U.S. Cl. X.R.
260—397.2, 397.4, 397.5, 999